(12) United States Patent
Krisko et al.

(10) Patent No.: US 7,989,094 B2
(45) Date of Patent: *Aug. 2, 2011

(54) OPPOSED FUNCTIONAL COATINGS HAVING COMPARABLE SINGLE SURFACE REFLECTANCES

(75) Inventors: Annette J. Krisko, Sauk City, WI (US); Kari B. Myli, Sauk City, WI (US); Gary L. Pfaff, Cazenovia, WI (US); James Brownlee, Cazenovia, WI (US)

(73) Assignee: Cardinal CG Company, Eden Prarie, MN (US)

( * ) Notice: Subject to any disclaimer, the term of this patent is extended or adjusted under 35 U.S.C. 154(b) by 912 days.

This patent is subject to a terminal disclaimer.

(21) Appl. No.: 11/735,804

(22) Filed: Apr. 16, 2007

(65) Prior Publication Data

US 2007/0248756 A1    Oct. 25, 2007

Related U.S. Application Data

(60) Provisional application No. 60/793,091, filed on Apr. 19, 2006.

(51) Int. Cl.
*B32B 15/04* (2006.01)
*B32B 17/06* (2006.01)
*C23C 14/10* (2006.01)

(52) U.S. Cl. ........ 428/701; 428/428; 428/432; 428/702; 427/402; 427/419.3; 204/192.1

(58) Field of Classification Search .................. 428/428, 428/432, 426, 701, 702; 427/402, 419.3; 204/192.1
See application file for complete search history.

(56) References Cited

U.S. PATENT DOCUMENTS

| | | | |
|---|---|---|---|
| 1,256,818 A | 2/1918 | Nile |
| 2,808,351 A | 10/1952 | Colbert |
| 2,780,553 A | 2/1957 | Pawlyk |
| 3,505,092 A | 4/1970 | Ryan |
| 3,528,906 A | 9/1970 | Cash, Jr. |
| 3,679,291 A | 7/1972 | Apfel |
| 3,727,666 A | 4/1973 | Vander Sluis |
| 3,829,197 A | 8/1974 | Thelen |
| 3,840,451 A | 10/1974 | Golyanov |
| 3,844,924 A | 10/1974 | Cunningham |
| 3,852,098 A | 12/1974 | Bloss |
| 3,854,796 A | 12/1974 | Thelen |

(Continued)

FOREIGN PATENT DOCUMENTS

CA    2290999    5/1998

(Continued)

OTHER PUBLICATIONS

International Search Report, dated May 11, 2007 for PCT Application No. PCT/US2007/066685, 6 pages.

(Continued)

*Primary Examiner* — Timothy Speer
*Assistant Examiner* — Lauren Robinson
(74) *Attorney, Agent, or Firm* — Fredrikson & Byron, PA

(57) ABSTRACT

A sheet-like pane bearing a low-maintenance coating on one surface and a low-emissivity coating on the opposite surface, wherein one of the low-maintenance coating and the low-emissivity coating has a single surface reflectivity of less than 3 times, and more than one-third, that of the other coating.

29 Claims, 7 Drawing Sheets

U.S. PATENT DOCUMENTS

| | | |
|---|---|---|
| 3,911,579 A | 10/1975 | Lane |
| 3,925,182 A | 12/1975 | Carmichael |
| 3,934,961 A | 1/1976 | Itoh |
| 3,968,018 A | 7/1976 | Lane |
| 3,970,037 A | 7/1976 | Sopko |
| 3,990,784 A | 11/1976 | Gelber |
| 4,012,119 A | 3/1977 | Adams |
| 4,029,566 A | 6/1977 | Brandmair |
| 4,045,125 A | 8/1977 | Farges |
| 4,052,520 A | 10/1977 | Chang |
| 4,060,660 A | 11/1977 | Carlson |
| 4,107,350 A | 8/1978 | Berg |
| 4,130,672 A | 12/1978 | Onoki |
| 4,166,018 A | 8/1979 | Chapin |
| 4,194,022 A | 3/1980 | Gillery |
| 4,212,663 A | 7/1980 | Aslami |
| 4,212,903 A | 7/1980 | Schnell |
| 4,214,014 A | 7/1980 | Hofer |
| 4,216,259 A | 8/1980 | Groth |
| 4,238,276 A | 12/1980 | Kinugawa |
| 4,252,629 A | 2/1981 | Bewer |
| 4,261,722 A | 4/1981 | Novak |
| 4,322,276 A | 3/1982 | Meckel |
| 4,331,526 A | 5/1982 | Kuehnie |
| 4,332,922 A | 6/1982 | Kossmehl |
| 4,336,119 A | 6/1982 | Gillery |
| 4,351,861 A | 9/1982 | Henery |
| 4,356,073 A | 10/1982 | McKelvey |
| 4,377,613 A | 3/1983 | Gordon |
| 4,422,916 A | 12/1983 | McKelvey |
| 4,422,917 A | 12/1983 | Hayfield |
| 4,440,822 A | 4/1984 | Gordon |
| 4,465,575 A | 8/1984 | Love |
| 4,466,258 A | 8/1984 | Sando |
| 4,466,877 A | 8/1984 | McKelvey |
| 4,485,146 A | 11/1984 | Mizuhashi |
| 4,486,286 A | 12/1984 | Lewin |
| 4,503,125 A | 3/1985 | Nelson |
| 4,504,519 A | 3/1985 | Zelez |
| 4,568,622 A | 2/1986 | Minami |
| 4,569,738 A | 2/1986 | Kieser |
| 4,571,350 A | 2/1986 | Parker |
| 4,576,864 A | 3/1986 | Krautter |
| 4,661,409 A | 4/1987 | Kieser |
| 4,673,475 A | 6/1987 | Windischmann |
| 4,704,339 A | 11/1987 | Green |
| 4,713,311 A | 12/1987 | Senske |
| 4,717,622 A | 1/1988 | Kurokawa |
| 4,725,345 A | 2/1988 | Sakamoto |
| 4,728,529 A | 3/1988 | Etzkorn |
| 4,732,454 A | 3/1988 | Saito |
| 4,737,252 A | 4/1988 | Hoffman |
| 4,769,291 A | 9/1988 | Belkind |
| 4,777,090 A | 10/1988 | Ovshinsky |
| 4,780,334 A | 10/1988 | Ackerman |
| 4,798,660 A | 1/1989 | Ermer |
| 4,814,056 A | 3/1989 | Welty |
| 4,816,127 A | 3/1989 | Eltouky |
| 4,834,857 A | 5/1989 | Gillery |
| 4,849,081 A | 7/1989 | Ross |
| 4,851,095 A | 7/1989 | Scobey |
| 4,859,493 A | 8/1989 | Lemelson |
| 4,861,680 A | 8/1989 | Meyer |
| 4,882,827 A | 11/1989 | Kusumi |
| 4,894,133 A | 1/1990 | Hedgcoth |
| 4,915,977 A | 4/1990 | Okamoto |
| 4,919,778 A | 4/1990 | Dietrich |
| 4,931,213 A | 6/1990 | Cass |
| 4,952,430 A | 8/1990 | Bowser |
| 4,961,958 A | 10/1990 | Desphandey |
| 4,981,568 A | 1/1991 | Taranko |
| 4,990,234 A | 2/1991 | Szczyrbowski |
| 5,006,248 A | 4/1991 | Anderson |
| 5,008,002 A | 4/1991 | Uno |
| 5,020,288 A | 6/1991 | Swensen |
| 5,026,415 A | 6/1991 | Yamamoto |
| 5,032,421 A | 7/1991 | Sarma |
| 5,035,784 A | 7/1991 | Anderson |
| 5,047,131 A | 9/1991 | Wolfe |
| 5,071,206 A | 12/1991 | Hood |
| 5,073,241 A | 12/1991 | Watanabe |
| 5,073,450 A | 12/1991 | Nietering |
| 5,090,985 A | 2/1992 | Soubeyrand |
| 5,104,539 A | 4/1992 | Anderson |
| 5,105,310 A | 4/1992 | Dickey |
| 5,106,671 A | 4/1992 | Amberger |
| 5,107,643 A | 4/1992 | Swensen |
| 5,108,574 A | 4/1992 | Kirs |
| 5,126,218 A | 6/1992 | Clarke |
| RE34,035 E | 8/1992 | Dimigen |
| 5,139,633 A | 8/1992 | Kashida |
| 5,165,972 A | 11/1992 | Porter |
| 5,171,414 A | 12/1992 | Amberger |
| 5,190,807 A | 3/1993 | Kimock |
| 5,194,990 A | 3/1993 | Boulos |
| 5,196,400 A | 3/1993 | Chen |
| 5,201,926 A | 4/1993 | Szczyrbowski |
| 5,209,996 A | 5/1993 | Kashida |
| 5,211,759 A | 5/1993 | Zimmermann |
| 5,245,468 A | 9/1993 | Demiryont |
| 5,254,392 A | 10/1993 | Burns |
| 5,284,539 A | 2/1994 | McKernan |
| 5,286,524 A | 2/1994 | Slutz |
| 5,302,449 A | 4/1994 | Eby |
| 5,306,547 A | 4/1994 | Hood |
| 5,318,830 A | 6/1994 | Takamatsu |
| 5,338,422 A | 8/1994 | Belkind |
| 5,342,676 A | 8/1994 | Zagdoun |
| 5,346,600 A | 9/1994 | Nieh |
| 5,354,446 A | 10/1994 | Kida |
| 5,356,718 A | 10/1994 | Athey |
| 5,366,764 A | 11/1994 | Sunthankar |
| 5,378,527 A | 1/1995 | Nakanishi |
| 5,394,269 A | 2/1995 | Takamatsu |
| 5,401,543 A | 3/1995 | O'Neill |
| 5,405,517 A | 4/1995 | Lampkin |
| 5,415,756 A | 5/1995 | Wolfe |
| 5,424,130 A | 6/1995 | Nakanishi |
| 5,453,459 A | 9/1995 | Roberts |
| 5,470,661 A | 11/1995 | Bailey |
| 5,476,713 A | 12/1995 | Abiko |
| 5,482,602 A | 1/1996 | Cooper |
| 5,498,475 A | 3/1996 | Takigawa |
| 5,507,930 A | 4/1996 | Yamashita |
| 5,514,485 A | 5/1996 | Ando |
| 5,520,996 A | 5/1996 | Balian |
| 5,529,631 A | 6/1996 | Yoshikawa |
| 5,558,751 A | 9/1996 | Mahler |
| 5,563,734 A | 10/1996 | Wolfe |
| 5,569,362 A | 10/1996 | Lerbet |
| 5,569,501 A | 10/1996 | Bailey |
| 5,589,280 A | 12/1996 | Gibbons |
| 5,593,784 A | 1/1997 | Chinzi |
| 5,593,786 A | 1/1997 | Parker |
| 5,594,585 A | 1/1997 | Komatsu |
| 5,595,813 A | 1/1997 | Ogawa |
| 5,595,825 A | 1/1997 | Guiselin |
| 5,597,622 A | 1/1997 | Zoller |
| 5,599,422 A | 2/1997 | Adams |
| 5,605,609 A | 2/1997 | Ando |
| 5,609,924 A | 3/1997 | McCurdy |
| 5,611,899 A | 3/1997 | Maass |
| 5,607,723 A | 4/1997 | Naruse |
| 5,616,225 A | 4/1997 | Sieck |
| 5,616,532 A | 4/1997 | Heller |
| 5,618,388 A | 4/1997 | Seeser |
| 5,618,590 A | 4/1997 | Naruse |
| 5,620,572 A | 4/1997 | Bjornard |
| 5,624,423 A | 4/1997 | Anjur |
| 5,624,760 A | 4/1997 | Collins |
| 5,633,208 A | 5/1997 | Ishikawa |
| 5,643,423 A | 7/1997 | Kimock |
| 5,643,432 A | 7/1997 | Qiu |
| 5,645,699 A | 7/1997 | Sieck |
| 5,645,900 A | 7/1997 | Ong |
| 5,669,144 A | 9/1997 | Hahn |
| 5,674,625 A | 10/1997 | Takahashi |

| | | | | | | |
|---|---|---|---|---|---|---|
| 5,674,658 | A | 10/1997 | Burberry | 6,319,326 B1 | 11/2001 | Koh |
| 5,679,431 | A | 10/1997 | Chen | 6,326,079 B1 | 12/2001 | Philippe |
| 5,683,560 | A | 11/1997 | Szczyrbowski | 6,329,925 B1 | 12/2001 | Skiver |
| 5,683,561 | A | 11/1997 | Hollars | 6,333,084 B1 | 12/2001 | Woodard |
| 5,698,262 | A | 12/1997 | Soubeyrand | 6,334,938 B2 | 1/2002 | Kida |
| 5,719,705 | A | 2/1998 | Machol | 6,350,397 B1 | 2/2002 | Heikkila |
| 5,723,172 | A | 3/1998 | Sherman | 6,352,755 B1 | 3/2002 | Finley |
| 5,724,187 | A | 3/1998 | Varaprasad | 6,354,109 B1 | 3/2002 | Boire |
| 5,733,660 | A | 3/1998 | Makita | 6,362,121 B1 | 3/2002 | Chopin |
| 5,733,669 | A | 3/1998 | Veyhl | 6,365,010 B1 | 4/2002 | Hollars |
| 5,745,291 | A | 4/1998 | Jenkinson | 6,379,746 B1 | 4/2002 | Birch |
| 5,750,265 | A | 5/1998 | Goodman | 6,379,776 B1 | 4/2002 | Tada |
| 5,755,867 | A | 5/1998 | Chikuni | 6,387,844 B1 | 5/2002 | Fujishima |
| 5,762,674 | A | 6/1998 | Maltby, Jr. | 6,403,686 B1 | 6/2002 | Pickett et al. |
| 5,763,087 | A | 6/1998 | Falabella | 6,413,581 B1 | 7/2002 | Greenberg |
| 5,780,119 | A | 7/1998 | Dearnaley | 6,414,213 B1 | 7/2002 | Ohmori |
| 5,780,149 | A | 7/1998 | McCurdy | 6,425,670 B1 | 7/2002 | Komatsu |
| 5,780,380 | A | 7/1998 | Endoh | 6,428,172 B1 | 8/2002 | Hutzel |
| 5,789,040 | A | 8/1998 | Martinu | 6,447,123 B2 | 9/2002 | Tonar |
| 5,811,191 | A | 9/1998 | Neuman | 6,451,178 B2 | 9/2002 | Szczyrbowski |
| 5,814,195 | A | 9/1998 | Lehan | 6,461,686 B1 | 10/2002 | Vanderstraeten |
| 5,814,196 | A | 9/1998 | Hollars | 6,465,088 B1 | 10/2002 | Talpaert |
| 5,820,994 | A | 10/1998 | Gotoh | 6,468,402 B1 | 10/2002 | Vanderstraeten |
| 5,830,252 | A | 11/1998 | Finley | 6,488,824 B1 | 12/2002 | Hollars |
| 5,830,327 | A | 11/1998 | Kolenkow | 6,500,690 B1 | 12/2002 | Yamagishi |
| 5,830,332 | A | 11/1998 | Babich | 6,501,387 B2 | 12/2002 | Skiver |
| 5,846,613 | A | 12/1998 | Neuville | 6,511,587 B2 | 1/2003 | Vanderstraeten |
| 5,849,200 | A | 12/1998 | Heller | 6,570,709 B2 | 5/2003 | Katayama |
| 5,853,866 | A | 12/1998 | Watanabe | 6,635,155 B2 | 10/2003 | Miyamura |
| 5,854,708 | A | 12/1998 | Komatsu | 6,660,365 B1 | 12/2003 | Krisko |
| 5,866,199 | A | 2/1999 | Swidler | 6,677,063 B2 | 1/2004 | Finley |
| 5,866,260 | A | 2/1999 | Adams, Jr. | 6,679,978 B2 | 1/2004 | Johnson |
| 5,869,187 | A | 2/1999 | Nakamura | 6,680,135 B2 | 1/2004 | Boire |
| 5,869,808 | A | 2/1999 | Hyllberg | 6,682,773 B2 | 1/2004 | Medwick et al. |
| 5,871,843 | A | 2/1999 | Yoneda | 6,720,066 B2 | 4/2004 | Talpaert |
| 5,873,203 | A | 2/1999 | Thiel | 6,777,091 B2 | 8/2004 | Kijima |
| 5,874,701 | A | 2/1999 | Watanabe | 6,789,906 B2 | 9/2004 | Tonar |
| 5,888,593 | A | 3/1999 | Petrmichl | 6,800,183 B2 | 10/2004 | Takahashi |
| 5,891,556 | A | 4/1999 | Anderson | 6,818,309 B1 | 11/2004 | Talpaert |
| 5,935,716 | A | 8/1999 | McCurdy | 6,829,084 B2 | 12/2004 | Takaki |
| 5,939,194 | A | 8/1999 | Hashimoto | 6,833,089 B1 | 12/2004 | Kawahara |
| 5,948,538 | A | 9/1999 | Brochot | 6,875,319 B2 | 4/2005 | Nadaud |
| 5,961,843 | A | 10/1999 | Hayakawa | 6,964,731 B1 | 11/2005 | Krisko |
| 5,962,115 | A | 10/1999 | Zmelty | 6,974,629 B1 | 12/2005 | Krisko |
| 5,965,246 | A | 10/1999 | Guiselin | 7,294,404 B2 | 11/2007 | Krisko |
| 5,968,328 | A | 10/1999 | Teschner | 7,604,865 B2 | 10/2009 | Krisko |
| 5,972,184 | A | 10/1999 | Hollars | 7,713,632 B2 | 5/2010 | Krisko |
| 6,013,372 | A | 1/2000 | Hayakawa | 2002/0012779 A1 | 1/2002 | Miyashita |
| 6,027,766 | A | 2/2000 | Greenberg | 2002/0046945 A1 | 4/2002 | Hosokawa |
| 6,037,289 | A | 3/2000 | Chopin | 2002/0102352 A1 | 8/2002 | Hartig |
| 6,045,903 | A | 4/2000 | Seino | 2002/0155299 A1* | 10/2002 | Harris et al. .................. 428/428 |
| 6,054,024 | A | 4/2000 | Toyama | 2002/0189938 A1 | 12/2002 | Baldwin |
| 6,054,227 | A | 4/2000 | Greenberg | 2003/0048538 A1 | 3/2003 | Tonar |
| 6,068,914 | A | 5/2000 | Boire | 2003/0064231 A1* | 4/2003 | Hurst et al. .................. 428/432 |
| 6,071,606 | A | 6/2000 | Yamazaki | 2004/0146721 A1* | 7/2004 | Hartig et al. .................. 428/432 |
| 6,071,623 | A | 6/2000 | Sugawara | 2004/0163945 A1 | 8/2004 | Hartig |
| 6,074,981 | A | 6/2000 | Tada | 2005/0016835 A1 | 1/2005 | Krisko |
| 6,090,489 | A | 7/2000 | Hayakawa | 2005/0025982 A1 | 2/2005 | Krisko |
| 6,103,363 | A | 8/2000 | Boire | 2005/0106397 A1 | 5/2005 | Krisko |
| 6,114,043 | A | 9/2000 | Joret | 2005/0137084 A1 | 6/2005 | Krisko |
| 6,124,044 | A | 9/2000 | Swidler | 2005/0244678 A1 | 11/2005 | Arfsten |
| 6,139,803 | A | 10/2000 | Watanabe | 2006/0105103 A1 | 5/2006 | Hartig |
| 6,154,311 | A | 11/2000 | Simmons | 2006/0121315 A1 | 6/2006 | Myli |
| 6,156,171 | A | 12/2000 | Hollars | 2007/0264494 A1 | 11/2007 | Krisko |
| 6,156,409 | A | 12/2000 | Doushita | | | |
| 6,165,256 | A | 12/2000 | Hayakawa | | | |
| 6,165,598 | A | 12/2000 | Nelson | | | |
| 6,165,616 | A | 12/2000 | Lemelson | | | |

FOREIGN PATENT DOCUMENTS

| | | |
|---|---|---|
| DE | 39 06 453 | 9/1990 |
| DE | 4313284 | 10/1994 |
| DE | 19736925 | 3/1998 |
| DE | 19644752 | 4/1998 |
| DE | 19831610 | 1/1999 |
| DE | 10100221 | 7/2001 |
| DE | 10100223 | 7/2001 |
| EP | 0 207 646 | 1/1987 |
| EP | 0 470 379 | 2/1992 |
| EP | 0 279 550 | 4/1993 |
| EP | 0 369 581 | 12/1993 |
| EP | 0 590 477 | 4/1994 |
| EP | 0 601 928 | 6/1994 |

(additional US references continued)

| | | | |
|---|---|---|---|
| 6,171,659 B1 | 1/2001 | Vanden Brande |
| 6,191,062 B1 | 2/2001 | Hayakawa |
| 6,193,378 B1 | 2/2001 | Tonar |
| 6,193,856 B1 | 2/2001 | Kida |
| 6,197,101 B1 | 3/2001 | Matsumura |
| 6,210,750 B1 | 4/2001 | Cho |
| 6,210,779 B1 | 4/2001 | Watanabe |
| 6,242,752 B1 | 6/2001 | Soma |
| 6,261,693 B1 | 7/2001 | Veerasamy |
| 6,270,633 B1 | 8/2001 | Onaka |
| 6,299,981 B1 | 10/2001 | Azzopardi |

| | | |
|---|---|---|
| EP | 0 611 733 | 8/1994 |
| EP | 0 516 847 | 2/1995 |
| EP | 0 636 702 | 2/1995 |
| EP | 0 637 572 | 2/1995 |
| EP | 0 639 655 | 2/1995 |
| EP | 0 657 562 | 6/1995 |
| EP | 0 689 096 | 12/1995 |
| EP | 0 689 962 | 1/1996 |
| EP | 0 737 513 | 10/1996 |
| EP | 0 753 882 | 1/1997 |
| EP | 0 328 257 | 4/1997 |
| EP | 0 771 766 | 5/1997 |
| EP | 0 787 696 | 8/1997 |
| EP | 0 799 255 | 10/1997 |
| EP | 0 820 967 | 1/1998 |
| EP | 0 838 535 | 4/1998 |
| EP | 0 850 203 | 7/1998 |
| EP | 0 850 204 | 7/1998 |
| EP | 0 870 530 | 10/1998 |
| EP | 0 884 288 | 12/1998 |
| EP | 0 887 104 | 12/1998 |
| EP | 0 901 991 | 3/1999 |
| EP | 0 944 557 | 9/1999 |
| EP | 1 046 727 | 10/2000 |
| EP | 1 074 525 | 2/2001 |
| EP | 1 179 515 | 2/2002 |
| EP | 1 254 870 | 11/2002 |
| EP | 1 375 444 | 1/2004 |
| EP | 1 411 386 | 4/2004 |
| EP | 1 466 665 | 10/2004 |
| EP | 1 500 634 | 1/2005 |
| EP | 1 518 836 | 3/2005 |
| EP | 1 640 149 | 3/2006 |
| FR | 2699164 | 2/1995 |
| FR | 2738812 | 3/1997 |
| FR | 2738813 | 3/1997 |
| FR | 2738836 | 3/1997 |
| FR | 2800731 | 5/2001 |
| FR | 2814094 | 3/2002 |
| FR | 2838734 | 10/2003 |
| FR | 2838735 | 10/2003 |
| FR | 2857885 | 1/2005 |
| FR | 2861385 | 4/2005 |
| FR | 2861386 | 4/2005 |
| FR | 2869897 | 11/2005 |
| GB | 0232680 | 4/1925 |
| GB | 1231280 | 5/1971 |
| GB | 1426906 | 3/1976 |
| GB | 1438462 | 6/1976 |
| GB | 2028376 | 3/1980 |
| GB | 1595061 | 8/1981 |
| GB | 2201428 | 2/1988 |
| GB | 2302102 * | 5/1996 |
| GB | 2316687 | 8/1997 |
| GB | 2327428 | 7/1998 |
| JP | 57-140339 | 8/1982 |
| JP | 60-081048 | 5/1985 |
| JP | 61-091042 | 5/1986 |
| JP | 62-161945 | 7/1987 |
| JP | 01-014129 | 1/1989 |
| JP | 01-118807 | 5/1989 |
| JP | 3-122274 | 5/1991 |
| JP | 3-187039 | 8/1991 |
| JP | 3-193872 | 8/1991 |
| JP | 7-149545 | 6/1995 |
| JP | 7-215074 | 8/1995 |
| JP | 7-233469 | 9/1995 |
| JP | 7-508491 | 9/1995 |
| JP | 7-315874 | 12/1995 |
| JP | 7-315889 | 12/1995 |
| JP | 8-011631 | 1/1996 |
| JP | 8-012378 | 1/1996 |
| JP | 8-109043 | 4/1996 |
| JP | 8-134638 | 5/1996 |
| JP | 8-227006 | 9/1996 |
| JP | 9-189801 | 7/1997 |
| JP | 9-202651 | 8/1997 |
| JP | 9-249967 | 9/1997 |
| JP | 10-36144 | 2/1998 |
| JP | 10-048805 | 2/1998 |
| JP | 11-095014 | 4/1999 |
| JP | 2005-213585 | 8/2005 |
| WO | 87/06626 | 11/1987 |
| WO | WO 89/10430 | 11/1989 |
| WO | 92/17621 | 10/1992 |
| WO | 96/25534 | 8/1996 |
| WO | 97/03763 | 2/1997 |
| WO | 97/07066 | 2/1997 |
| WO | 97/07069 | 2/1997 |
| WO | 97/08359 | 3/1997 |
| WO | 97/10185 | 3/1997 |
| WO | 97/10186 | 3/1997 |
| WO | 97/11916 | 4/1997 |
| WO | 97/15499 | 5/1997 |
| WO | 97/25201 | 7/1997 |
| WO | 97/37946 | 10/1997 |
| WO | 97/42351 | 11/1997 |
| WO | 97/42357 | 11/1997 |
| WO | 98/06675 | 2/1998 |
| WO | 98/23549 | 6/1998 |
| WO | 98/25700 | 6/1998 |
| WO | 00/13257 | 3/2000 |
| WO | 00/37376 | 6/2000 |
| WO | 00/37377 | 6/2000 |
| WO | 00/50354 | 8/2000 |
| WO | 00/75087 | 12/2000 |
| WO | WO 00/75083 | 12/2000 |
| WO | 01/02496 | 1/2001 |
| WO | 01/32578 | 5/2001 |
| WO | 01/71055 | 9/2001 |
| WO | 02/24971 | 3/2002 |
| WO | 02/085809 | 10/2002 |
| WO | WO 03/006393 | 1/2003 |
| WO | WO 03/095695 | 1/2003 |
| WO | 03/012540 | 2/2003 |
| WO | 03/050056 | 6/2003 |
| WO | 03/053577 | 7/2003 |
| WO | 03/072849 | 9/2003 |
| WO | 03/080530 | 10/2003 |
| WO | 03/087002 | 10/2003 |
| WO | 03/087005 | 10/2003 |
| WO | 03/106732 | 12/2003 |
| WO | WO 2004/061151 | 7/2004 |
| WO | 2004/067464 | 8/2004 |
| WO | 2004/085701 | 10/2004 |
| WO | 2004/113064 | 12/2004 |
| WO | WO 2004/108619 | 12/2004 |
| WO | 2005/000758 | 1/2005 |
| WO | 2005/000759 | 1/2005 |
| WO | 2005/009914 | 2/2005 |
| WO | 2005/012593 | 2/2005 |
| WO | 2005/040056 | 5/2005 |
| WO | 2005/040058 | 5/2005 |
| WO | WO 2005/063646 | 7/2005 |
| WO | 2005/102953 | 11/2005 |
| WO | 2005/110937 | 11/2005 |
| WO | WO 2006/017311 | 2/2006 |
| WO | WO 2006/017349 | 2/2006 |
| WO | WO 2006/036605 | 4/2006 |

OTHER PUBLICATIONS

Written Opinion, dated May 11, 2007 for PCT Application No. PCT/US2007/066685, 6 pages.

International Preliminary Report on Patentability, dated Oct. 22, 2008 for PCT Application No. PCT/US2007/066685, 7 pages.

Hans-Joachim Becker et al., "Herstellung und Eigenschaften von Flachgläsern, die mittels Hochvakuum-zerstäu-bungsverfahrens beschichtet wurden" Magazine Silikattechnik 36 (1985) Issue 5.

Hans-Joachin Gläser, "Beschichtung großflächiger Substratscheiben durch Kathodenzerstäubung" Glastechnische Berichte 56 (1983) No. 9.

Ion-Based Methods for Optical Thin Film Deposition (Journal of Material Science; J.P. Marting, 21 (1986) 1-25).

Vakuumbeschichtung 5 Anwendungen Teil II, VDI Verlag 1993, ISBN 3-18-401315-4.

Anderson et al., "Improved Photocatalytic Activity and Characterization of Mixed TiO2/SiO2 and TiO2/Al2O3 Materials", J. Phys. Chem., 1997, 101, 2611-2616.

Anderson et al., "An Improved Photocatalyst of TiO2/SiO2 prepared by a Sol-Gel Synthesis", J. Phys. Chem., 1995, 99, 9882-9885.

Chen Wen-mei et al, "The Effect of SiO2 Additive on Super-hydrophilic Property of TiO2-SiO2 Thin Film by Sol-gel Method", Journal of Wuhan University of Technology-Mater. Sci. Ed. (Sep. 2001), vol. 16, No. 3, 30-33.

Guan et al, "Enhanced effect and mechanism of SiO2 addition in super-hydrophilic property of TiO2 films" Surf. And Coating Tech 173 (2003) pp. 219-223.

Guan, "Relationship between photocatalytic activity, hydrophilicity and self-cleaning effect of TiO2/SiO2 films" Surf. And Coating Tech 191 (2005) pp. 155-160.

Guan, "Hydrophilic property of TiO2/SiO2 mixing films" Trans. Nonferrous Met. Soc. China (2004), vol. 14, No. 2, pp. 251-254.

Ingo et al., "XPS studies of SiO2-TiO2 powders prepared by sol-gel process", Appl. Surf. Sci. 1993, 70/71A, pp. 230-234.

Lassaletta et al., "Spectroscopic Characterization of Quantum-Sized TiO2 Supported on Silica: Influence of Size and TiO2-SiO2 Interface Composition", J. Phys. Chem., 1995, 99, 484-1490.

Matthews et al., "An Adsorption Water Purifier with in Situ Photocatalytic Regeneration", J. Catal. 1988, 113, pp. 549-555.

Minero et al., "Role of Adsorption in Photocatalyzed Reactions of Organic Molecules in Aqueous of TiO2 Suspensions", Langmuir, 1992, 113, pp. 481-486.

Miyashita, et al., "Enhanced Effect of Vacuum-deposited SiO2 Overlayer on Photo-induced Hydrophilicity of TiO2 Film", Journal of Materials Science 36 (2001) p. 3877-3884.

Miyashita et al., "Spectrum response of the vacuum-deposited SiO2/TiO2 multilayer film with improved photo-catalytic activity", Journal of Materials Science Letters, 2001, 20, 2137-2140.

Nakamura, et al., "Hydrophilic property of SiO2/TiO2 double layer films" Photocatalytic Coatings, Panel Session, pp. 345-350, (2004).

Niwa et al., Ammoxidation of Toluene Over SiO2—Al2O3 ZrO2—SiO2 and TiO2-SiO2, J. Catal. 1981, 69, pp. 69-76.

Novotná, et al., "Photocatalytical TiO2/SiO2—PDMS layers on glass" Photocatalytic Coatings, Panel Session, pp. 383-387, (2004).

Ohsaki, et al., "Photocatalytic properties of SnO2/TiO2 multilayers" Photocatalytic Coatings, Panel Session, pp. 369-376, (2004).

Ramirez-Del-Solar et al., "Effect of the Method of Preparation on the Texture of TiO2-SiO2 Gels", J. Non-Cryst. Solids 1990, 121, pp. 84-89.

Salvado et al., "TiO2-SiO2 glasses prepared by the alkoxide route", J. Non-Cryst. Solids 1992, 1471148, pp. 256-261.

Satoh et al., "Sol-gel-derived binary silica glasses with high refractive index", J. Non-Cryst. Solids 1992, 146, pp. 121-128.

Schraml-Marth et al., "Porous silica gels and TiO2-SiO2 mixed oxides prepared via the sol-gel process: characterization by spectroscopic techniques", J. Non-Cryst. Solids 1992, 143, pp. 93-111.

Shibata, K., et al., "Acidic Properties of Binary Metal Oxides", Bull. Chem. Soc. Jpn. 1973, 46, pp. 2985-2988.

Stakheev, et al., "XPS and XAES Study of TiO2-SiO2 Mixed Oxide System", J. Phys. Chem. 1993, 97, pp. 5668-5672.

Takeuchi, et al., "Preparation of Titanium-Silicon Binary Oxide Thin Film Photocatalysts by an Ionized Cluster Beam Deposition Method. Their Photocatalytic Activity and Photoinduced Super-Hydrophilicity", J. Phys. Chem. 2003, 107, pp. 14278-14282.

Yu et al., "The grain size and surface hydroxyl content of super-hydrophilic TiO2-SiO2 composite nanometer thin films" J. Mat. Sci. Lett. (2001) 20, pp. 1745-1748.

Veersamy, et al., "Optical and Electronic Properties of Amorphous Diamond." Diamond and Related Materials, vol. 2 (1993), pp. 782-787.

"Surface Hardening of Ceramic and Glass Materials," IBM Technical Disclosure Bulletin, vol. 36, Issue 1 (Jan. 1993), p. 225.

"Surface Hardening of Ceramic and Glass Materials," IBM Technical Disclosure Bulletin, vol. 36, Issue 3 (Mar. 1993), pp. 291-292.

MikroElektronick—High-rate Sputtering System for Two-Sided Coating (HZS-04), (2004).

Kobayashi et al., "V2 O5-WO3/TiO2-SiO2-SO42- catalysts: Influence of active components and supports on activities in the selective catalytic reduction of NO by NH3 and in the oxidation of SO2" App. Cat. B: Enviro 63. (2006), pp. 104-113.

Abstract—Japanese Patent Publication 4-276066, (1992).

Abstract—Japanese Patent Publication 5-214525, (1993).

Abstract—Japanese Patent Publication 6-330297, (1994).

Derwent Abstract 007612002 (Abstract of JP 879697), (1988).

Abstract Japanese Patent Publication 08158048A, (1996).

* cited by examiner

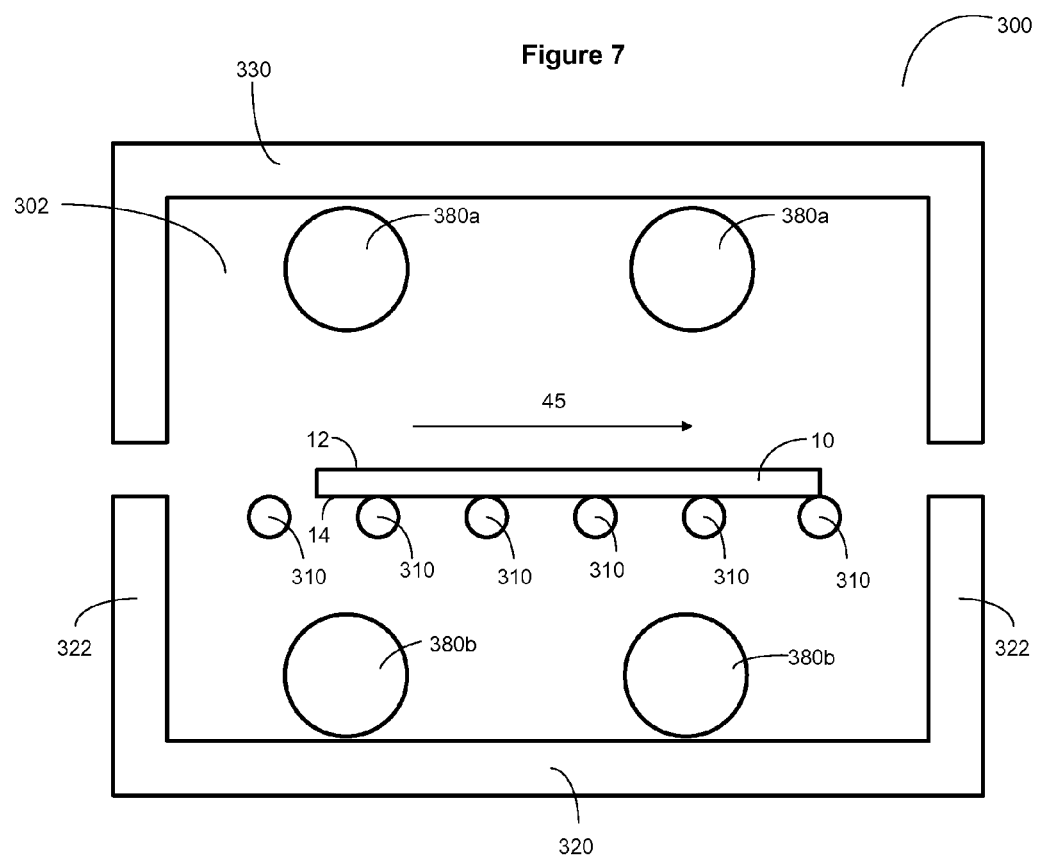

OPPOSED FUNCTIONAL COATINGS HAVING COMPARABLE SINGLE SURFACE REFLECTANCES

CROSS-REFERENCE TO RELATED APPLICATION

The present application claims priority to U.S. Application No. 60/793,091, filed Apr. 19, 2006, the entire disclosure of which is incorporated herein by reference.

FIELD OF THE INVENTION

The present invention provides thin film coatings for substrates. More particularly, the invention provides thin film coatings for glass and other sheet-like substrates. The invention also provides methods for depositing thin film coatings onto glass and other sheet-like substrates. Further, the invention provides substrates bearing such coatings, as well as windows and other glazings comprising such coated substrates.

BACKGROUND OF THE INVENTION

Low-maintenance coatings, e.g., photocatalytic coatings and hydrophilic coatings, are known in the art. Photocatalytic coatings, e.g., titanium dioxide coatings, have self cleaning characteristics in that organic matter deposited on the surface of the coatings can be chemically degraded by the coatings. Generally, a thicker titanium dioxide coating is more efficient at degrading organic matter but is often very reflective. A thinner titanium dioxide coating is less reflective but may not be as efficient in degrading organic matter. Highly reflective coatings are undesirable because they are somewhat mirror like, which creates an undesirable appearance when the coating is provided on transparent substrates, e.g., window panes.

Low-emissivity coatings are also known in the art. Typically, they include one or more infrared-reflective films each positioned between two or more transparent dielectric films. The infrared-reflective films, which are typically conductive metals such as silver, gold, or copper, reduce the transmission of radiant heat through the coating (e.g., by reflecting infrared radiation). The transparent dielectric films are used primarily to reduce visible reflectance and to control other coating properties, such as color. Commonly used transparent dielectrics include oxides of zinc, tin, and titanium, as well as nitrides such as silicon nitride. Low-emissivity coatings are often designed to achieve a combination of properties tailored to meet the requirements of a particular application. The thickness of the dielectric films, for example, can be modified to achieve particular transmission, reflection, and color properties.

It would be desirable to provide both a low-maintenance coating and a low-emissivity coating on the same pane. It would be particularly desirable to provide such a pane with good balance of low-maintenance properties, thermal-insulating properties, neutral color, high visible transmission, and low visible reflectance.

SUMMARY OF THE INVENTION

In some embodiments, a sheet-like pane having generally opposed first and second major surfaces is provided, where the first major surface bears a low-maintenance coating and the second major surface bears a low-emissivity coating, wherein one of the low-maintenance coating and the low-emissivity coating has a single surface reflectance that is less than 3 times, and more than one-third, that of the other coating. In some cases, one of the low-maintenance coating and the low-emissivity coating has a single surface reflectance that is less than about 2½ times, and more than about 0.4 times, that of the other coating. In certain cases, the low-maintenance coating has a single surface reflectance that is between about 2 and about 2½ times that of the low-emissivity coating. Both the low-maintenance coating and the low-emissivity coating can be sputtered coatings. In some cases, the substrate is a window pane mounted in a window frame, such that the low-maintenance coating is exposed to an outdoor environment. The window pane can also be part of an insulating glass unit comprising two spaced-apart panes bounding a between-pane space.

The low-maintenance coating, in some cases, includes a titanium-containing film. The titanium-containing film can include titanium dioxide or substoichiometric titanium dioxide. The titanium-containing film can also be provided as a mixed film comprising titania and silica. The titanium-containing film can also have a thickness of less than 100 angstroms, less than about 75 angstroms, less than about 70 angstroms, less than about 60 angstroms, less than about 50 angstroms, or between 5 angstroms and 45 angstroms, such as about 40 angstroms or about 25 angstroms. In some embodiments, the low-maintenance coating comprises at least two films and has a total thickness of less than 350 Å or less than 175 Å. For example, the low-maintenance coating can include a base film and a titanium-containing film. In certain cases, the base film is deposited directly onto the substrate and the titanium-containing film is deposited onto the base film. The base film can be a silicon-containing film and in some cases comprises silica and alumina.

The low-emissivity coating, in some cases, comprises, from the second major surface outwardly, an inner transparent dielectric film region having a thickness of between about 80 angstroms and about 100 angstroms, an infrared-reflecting film having a thickness of between about 60 angstroms and about 80 angstroms, a metal-containing blocker film having a thickness of between about 10 angstroms and between about 20 angstroms, a middle transparent dielectric film region having a thickness of between about 450 angstroms and about 570 angstroms, an infrared-reflecting film having a thickness of between about 115 angstroms and about 145 angstroms, a metal-containing blocker film having a thickness of between about 10 angstroms and about 20 angstroms, and an outer transparent dielectric film region having a thickness of between about 275 angstroms and about 345 angstroms.

In some embodiments, a sheet-like pane bearing a low-maintenance coating on a first major surface and a low-emissivity coating on a second major surface, is provided. One of the low-maintenance coating and the low-emissivity coating has a single surface reflectance that is less than 3 times, and more than one-third, that of the other coating, wherein the low-maintenance coating has a thickness of less than about 350 angstroms and comprises a silicon-containing base film positioned directly over the first major surface and a titanium-containing film positioned directly over the base film, wherein the silicon-containing base film has a thickness of less than about 100 angstroms, and wherein the titanium-containing film has a thickness of less than about 50 angstroms.

In other embodiments, a sheet-like pane bearing a low-maintenance coating on a first major surface and a low-emissivity coating on a second major surface is provided, wherein one of the low-maintenance coating and the low-emissivity coating has a single surface reflectance that is between about 2 and about 2½ times that of the other coating, wherein the low-maintenance coating has a thickness of less than about 200 angstroms and comprises a base film positioned directly over the first major surface and a titanium-containing film positioned directly over the base film, wherein the base film comprises silica has a thickness of less than about 100 angstroms, and wherein the titanium-containing film has a thickness of less than about 50 angstroms.

In other embodiments, a method of depositing a low-emissivity coating onto a first major surface of a sheet-like pane and depositing a low-maintenance coating onto a second major surface of the pane is provided. The method comprises depositing a low-maintenance coating onto the first major surface and depositing a low-emissivity coating onto the second major surface, wherein one of the low-emissivity coating and the low-maintenance coating has a single surface reflectance of less than 3 times, and more than one-third, that of the other coating. The low-maintenance coating can include a base film deposited as a film comprising silica or as a film consisting essentially of silica. The low-maintenance coating can also include a titanium-containing film deposited as a film comprising titanium dioxide or substoichiometric titanium oxide. In some cases, the titanium-containing film is deposited at a thickness of less than about 50 angstroms. Likewise, in some cases, the base film is deposited at a thickness of less than about 100 angstroms. The titanium-containing film can also be deposited as a mixed film comprising titania and silica. In such cases, the mixed film can be deposited so that titania is present in an amount less than about 30 weight percent with the remainder being silica. In certain cases, the method further comprises mounting the substrate in a window frame, such that the first major surface is exposed to an outdoor environment. The low-maintenance coating and low-emissivity coating are both deposited by sputtering, in some embodiments. The sputtering can be carried out while maintaining the pane at a temperature of less than about 250 degrees Celsius.

BRIEF DESCRIPTION OF THE DRAWINGS

FIG. 7 is a schematic side view of a dual-direction sputtering chamber that is adapted for use in certain methods of the invention.

DETAILED DESCRIPTION OF THE PREFERRED EMBODIMENTS

Figure 1:
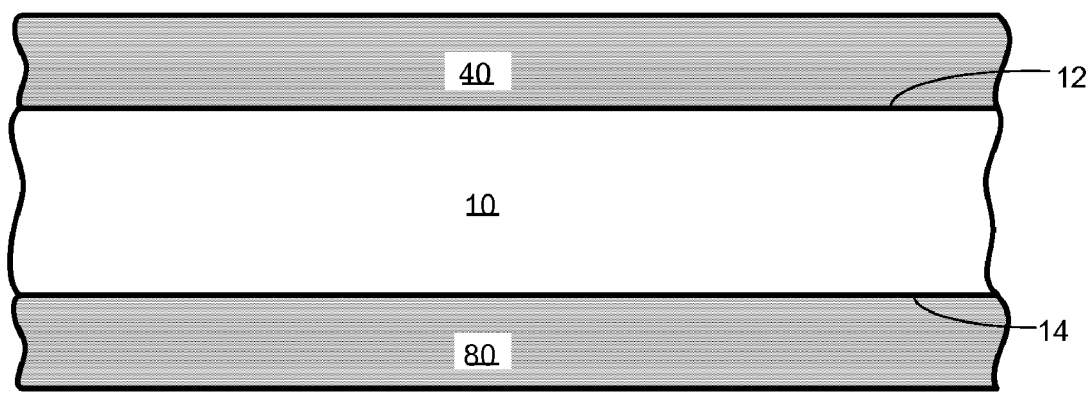
FIG. 1 is a partially broken-away schematic cross-sectional view of a substrate bearing both a low-maintenance coating and a low-emissivity coating in accordance with certain embodiments of the invention.

The following detailed description is to be read with reference to the drawings, in which like elements in different drawings have like reference numbers. The drawings, which are not necessarily to scale, depict selected embodiments and are not intended to limit the scope of the invention. Skilled artisans will recognize that the given examples have many alternatives that fall within the scope of the invention.

Many embodiments of the invention involve a coated substrate. A wide variety of substrate types are suitable for use in the invention. In some embodiments, the substrate 10 is a sheet-like substrate having generally opposed first 12 and second 14 major surfaces. For example, the substrate can be a sheet of transparent material (i.e., a transparent sheet). The substrate, however, is not required to be a sheet, nor is it required to be transparent.

The substrate can optionally be a component of any of a variety of building materials. Examples of anticipated applications include embodiments wherein the substrate is a sash (e.g., a window sash or a door sash), a siding panel (e.g., an aluminum siding panel), a tent panel, a tarpaulin (e.g., a fluorocarbon polymer tarpaulin), a plastic film (e.g., a fluorocarbon plastic film), a roofing shingle, a window blind (such as a metal, plastic, or paper window blind), a paper screen (e.g., a shoji), a railing, a baluster, or an escutcheon. In one embodiment, the substrate is a ceramic tile, such as a wall, ceiling, or floor tile. In another embodiment, the substrate is a glass block. A variety of suitable glass blocks can be obtained commercially from Saint-Gobain Oberland (Koblenz, Germany). In still other embodiments, the substrate is a polyester film, a polyethylene film, a terephthalate film, etc. Suitable films of this nature can be obtained commercially from Nippon Soda Co., Ltd. (Tokyo, Japan). In further embodiments, the substrate is a fence or wall, such as a noise-reduction fence or wall.

Other anticipated applications include embodiments wherein the substrate 10 is part of a sink, toilet, urinal cover, lighting fixture, a cover for a lighting fixture (e.g., a lamp cover), or another bathroom fixture or appliance. Still further, the substrate in one embodiment is a key, button, or key pad for a computer or another machine. In yet another embodiment, the substrate is an article of paper clothing (e.g., a paper-based shirt, dress, or pants for medical professionals), an article of cloth clothing, or an article of clothing of another fabric.

For many applications, the substrate will comprise a transparent (or at least translucent) material, such as glass or clear plastic. For example, the substrate is a glass sheet (e.g., a window pane) in certain embodiments. A variety of known glass types can be used, and soda-lime glass will commonly be preferred. In certain preferred embodiments, the substrate is part of a window, skylight, door, or other glazing. In some cases, the substrate is part of an automobile windshield, an automobile side window, an exterior or interior rear-view mirror, a bumper, a hubcap, a windshield wiper, or an automobile hood panel, side panel, trunk panel, or roof panel. In other embodiments, the substrate is a piece of aquarium glass, a plastic aquarium window, or a piece of greenhouse glass. In a further embodiment, the substrate is a refrigerator panel, such as part of a refrigerator door or window.

Substrates of various sizes can be used in the present invention. Commonly, large-area substrates are used. Certain embodiments involve a substrate 10 having a major dimension (e.g., a length or width) of at least about 0.5 meter, preferably at least about 1 meter, perhaps more preferably at least about 1.5 meters (e.g., between about 2 meters and about 4 meters), and in some cases at least about 3 meters. In some embodiments, the substrate is a jumbo glass sheet having a length and/or width that is between about 3 meters and about 10 meters, e.g., a glass sheet having a width of about 3.5 meters and a length of about 6.5 meters. Substrates having a length and/or width of greater than about 10 meters are also anticipated.

In some embodiments, the substrate 10 is a generally square or rectangular glass sheet. The substrate in these embodiments can have any of the dimensions described in the preceding paragraph and/or in the following paragraph. In one particular embodiment, the substrate is a generally rectangular glass sheet having a width of between about 3 meters and about 5 meters, such as about 3.5 meters, and a length of between about 6 meters and about 10 meters, such as about 6.5 meters.

Substrates of various thicknesses can be used in the present invention. In some embodiments, the substrate 10 (which can optionally be a glass sheet) has a thickness of about 1-5 mm. Certain embodiments involve a substrate 10 with a thickness of between about 2.3 mm and about 4.8 mm, and perhaps more preferably between about 2.5 mm and about 4.8 mm. In one particular embodiment, a sheet of glass (e.g., soda-lime glass) with a thickness of about 3 mm is used. In one group of embodiments, the thickness of the substrate (which can be glass, plastic, or another material) is between about 4 mm and about 20 mm. Thicknesses in this range, for example, may be useful for aquarium tanks (in which case, the substrate can optionally be glass or acrylic). When the substrate is float glass, it will commonly have a thickness of between about 4 mm and about 19 mm. In another group of embodiments, the substrate is a thin sheet (e.g., of glass) having a thickness of between about 0.35 mm and about 1.9 mm. Embodiments of this nature can optionally involve the substrate 10 being a sheet of display glass or the like.

In certain embodiments, a substrate is provided having two opposed major surfaces. A low-maintenance coating is provided on one surface and a low-emissivity coating is provided on an opposite surface. Preferably, one of the coatings has a single surface reflectivity of less than 3 times, and more than one-third, that of the other coating. In preferred embodiments, one coating has a single surface reflectivity of between about 2 and 3 times that of the other coating. In particularly preferred embodiments, one of the coatings has a single surface reflectance of between about 2 and about 2½ times that of the other coating.

With reference to FIG. 1, a substrate 10 is provided having a first surface 12 and a second surface 14. The first surface 12 bears a low-maintenance coating 40 and the second surface 14 bears a low-emissivity coating 80. In some cases, either the low-emissivity coating 80 or the low-maintenance coating 40 has a single surface reflectivity of less than 3 times, and more than one-third, more preferably between about 2 and 3 times, and perhaps optimally between about 2 and about 2½ times, that of the other coating. In certain cases, one of the coatings has a single surface reflectance of about 2.1 times that of the other coating.

The single surface reflectance of each coating is determined by measuring the reflectance of the substrate surface bearing that coating while excluding reflection from the opposite surface. For example, when measuring the reflectance of a low-maintenance coating 40 on surface 12 of the substrate, the reflection at the surface 14 is excluded. Likewise, when measuring the reflectance of a low-emissivity coating 80 at the surface 14, the reflection at the surface 12 is excluded. In making these determinations, there is no coating present on the excluded surface. Moreover, the excluded surface is treated to remove substantially all materials that contribute to reflection. In particular, the excluded surface is etched. An etching cream is applied to the excluded surface to etch the glass. One suitable glass etching cream is commercially available under the name "Armour Etch" and is available from Armour Products, a company located in Hawthorne, N.J. Visible reflectance can then be determined in accordance with NFRC 300, Standard Test Method for Determining the Solar and Infrared Optical Properties of Glazing Materials and Fading Resistance of Systems (National Fenestration Rating Council Incorporated, adopted December 2001, published January 2002). The well known WINDOW 5.2a computer program can be used in calculating these and other reported optical properties.

Figure 2:
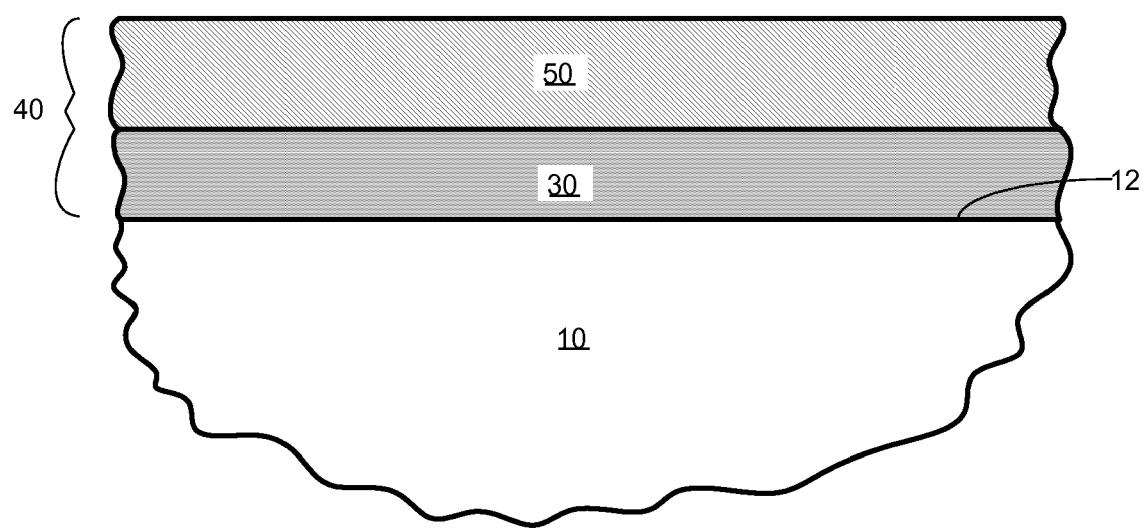
FIG. 2 is a partially broken-away schematic cross-sectional view of a substrate bearing a low-maintenance coating in accordance with certain embodiments of the invention.

The low-maintenance 40 coating preferably is a self-cleaning coating, such as a photocatalytic coating, or a hydrophilic coating. Suitable examples of low-maintenance coatings are described in PCT applications PCT/US2005/024901 and PCT/US2005/024739, entitled "Low-Maintenance Coatings", the entire teachings of which are incorporated herein by reference. With reference to FIG. 2, in certain embodiments, the low-maintenance coating 40 includes at least two films: (1) a base film 30 deposited over a major surface 12 of the substrate 10; and (2) a titania-containing film 50 deposited over the base film 30. The term "titania-containing" is used herein to refer to a material that includes at least some titania. Likewise, the term "titanium-containing" is used herein to refer to a material that includes at least some titanium. The same convention is used for other materials (silicon, silica, etc.).

In some embodiments of the present invention, the base film 30 is deposited directly over the substrate 10 (e.g., directly over a major surface 12 of the substrate). The base film 30 can generally comprise any dielectric film, preferably an amorphous or substantially amorphous film. In preferred embodiments, this film 30 comprises silica (e.g., silicon dioxide). In some cases a major weight percentage (i.e., 50% or more) of the base film 30 is silica. When the base film 30 is a silica film, it can include small amounts of an electrically-conductive material, such as aluminum, which may be oxidized in the film 30. For example, this film 30 can be deposited by sputtering a silicon-containing target that includes a small amount of aluminum or another metal that enhances the electrical conductivity of the target.

The base film 30 (an entire thickness of which may comprise silica) preferably has (e.g., is deposited at) a physical thickness of less than about 300 angstroms, and perhaps more preferably less than 100 angstroms. In certain embodiments, the film 30 has a thickness of less than 95 angstroms.

The titania-containing film 50, in some embodiments, is deposited directly over the base film 30. In some cases, the titania-containing film 50 is deposited directly over an entirely or substantially amorphous base film. For example, the substrate can optionally be a glass sheet that has been subjected to a post-coating-deposition glass tempering procedure, and yet the base film 30 can be entirely or substantially amorphous, such that the titania-containing film 50 is directly over an entirely or substantially amorphous base film. The titania-containing film 50 can comprise one or more other materials, such as oxides of iron, silver, copper, tungsten, aluminum, zinc, strontium, palladium, gold, platinum, nickel, cobalt, or combinations thereof. Preferably a major percentage (e.g., by weight) of the film 50 is titania. In preferred embodiments, this film 50 consists essentially of, or consists of, titanium dioxide. In some embodiments, though, the film 50 consists essentially of, or consists of, substoichiometric titanium oxide ($TiO_x$, where x is less than 2).

The film 50 (an entire thickness of which may consist essentially of titania) desirably has (e.g., is deposited at) a physical thickness of less than 100 angstroms. In some embodiments, the film 50 has a thickness of less than about 75 angstroms, less than about 70 angstroms, less than about 60 angstroms, less than about 50 angstroms, such as less than about 45 angstroms. In one particular embodiment, the film 50 has a thickness of between about 5 angstroms and about 45 angstroms, such as about 40 angstroms or about 25 angstroms. Moreover, in some embodiments, both the base film 30 and the film 50 are sputtered films (optionally sputtered reactively using one or more metallic targets consisting essentially of titanium), which may have been deposited at low temperatures (e.g., sputter deposited while maintaining the substrate at less than about 250 degrees Celsius).

In certain embodiments, the titania-containing film 50 is provided as a mix comprising titania and silica. In some embodiments of this nature, the mix comprises titania in an amount that is less than about 30% by weight relative to the total weight of the film 50. In embodiments of this nature, when the mixed film is, for example, about 30% titania and about 70% silica, the refractive index of the mixed film will be about 1.7. When the mixed film is about 20% titania and about 80% silica, the refractive index of the mixed film will be about 1.66. When the mixed film is about 10% titania and about 90% silica, the refractive index of the mixed film will be about 1.57. In some preferred embodiments, the mixed film consists essentially of a mix of titania and silica and includes between about 10 and about 30 weight percent titania, with the remainder being silica. Larger percentages of titania in a mixed film can alternatively be used.

The relative amounts of the different materials in a mixed film can be controlled in various ways. For example, if a film comprising a mix of titania and silica is to be co-sputtered from respective titanium and silicon targets. The rate of emission from each silicon target can be controlled by selecting the power on each silicon target, and the rate of emission from each titanium target can be controlled by selecting the power on each titanium target. Sputtering tends to proceed at different rates for titanium and silicon targets, even when the targets are sputtered at the same power and in the same oxidizing atmosphere. By taking into consideration these different rates, the power level on each target is selected so as to achieve a mixed silica-titania film having the desired relative amounts (e.g., weight percentages) of titania and silica and/or the desired relative amounts (e.g., atomic percentages) of titanium atoms and silicon atoms.

Alternatively, a film consisting essentially of a mix of titania and silica can be deposited by sputtering one or more targets carrying a sputterable target material consisting essentially of silicon, titanium, and oxygen, optionally together with some aluminum. Here, the relative amounts of titanium and silicon in the resulting film can be controlled by selecting desired relative percentages for the titanium and silicon in the target(s). Still further, a mixed film consisting essentially of silica and titania in desired relative amounts can be deposited using a pyrolysis method in which desired relative amounts of titania and silica precursor materials are used. The same is true of sol gel methods and other deposition methods involving precursors and/or other starting materials. Moreover, these and other methods can be used to deposit a mixed film having many compositions other than one consisting essentially of silica and titania.

Certain embodiments provide a substrate 10 (e.g., a glass sheet) having a first major surface 12 directly over which is deposited a base film 30 comprising silica (e.g., $SiO_2$) at a thickness of less than 100 angstroms, wherein a titania-containing film 50 consisting essentially of titania (e.g., $TiO_2$) is deposited directly over the base film 30 at a thickness of less than 50 angstroms. In some preferred embodiments of this nature, the base film 30 has a thickness of about 75-90 angstroms, while the titania-containing film 50 has a thickness of about 25-45 angstroms, such as about 40 angstroms or about 25 angstroms. In some cases, the base film comprises both silica and a small amount of alumina. Table 1 depicts an exemplary embodiment of this nature.

TABLE 1 air
40 angstroms $TiO_2$
90 angstroms $SiO_2$
glass

Figure 3:
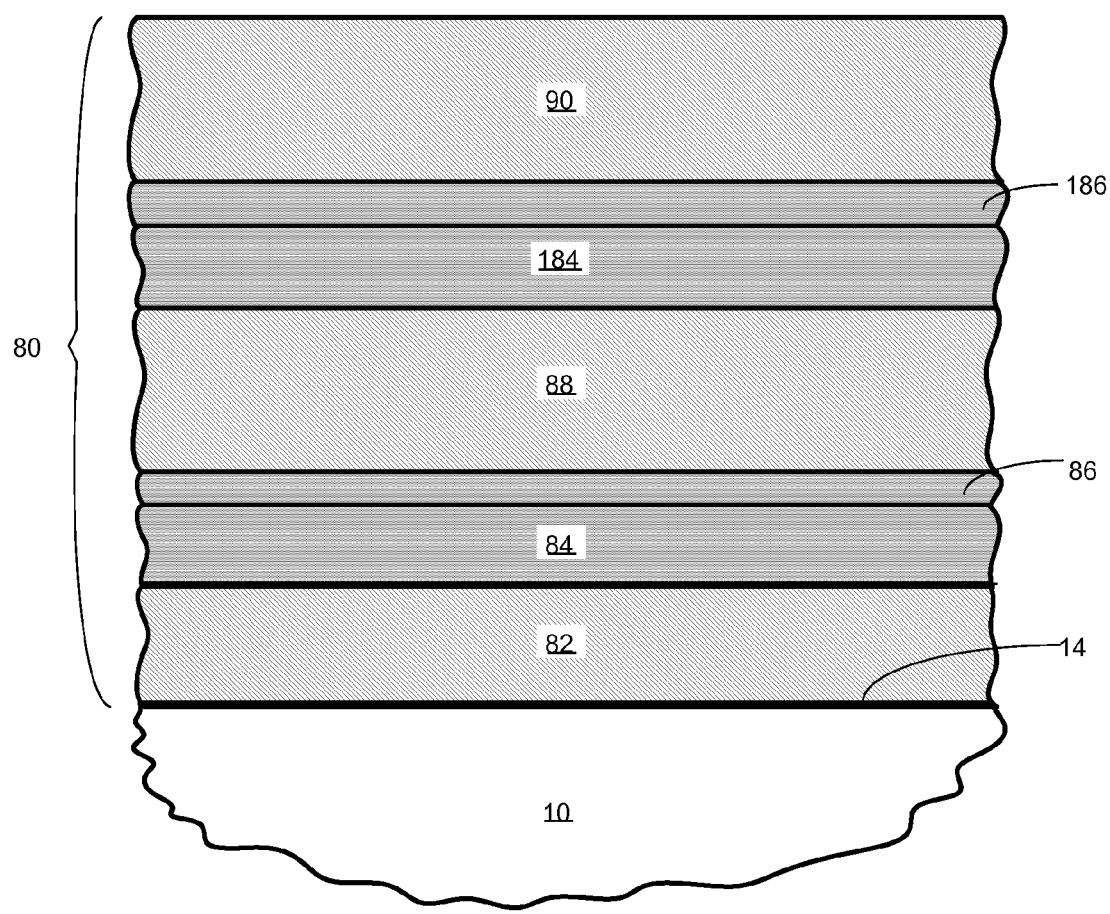
FIG. 3 is a partially broken-away schematic cross-sectional view of a substrate bearing a low-emissivity coating in accordance with certain embodiments of the invention.

With reference to FIG. 1, the illustrated substrate 10 is also provided with a low-emissivity coating 80 on the second surface 14 of the substrate. The low-emissivity coating can be a single-type coating, a double-type coating, a triple-type coating, etc. Single-type coatings have a single infrared-reflecting layer, double-type coatings have double infrared-reflecting layers, and triple-type coatings have three infrared-reflecting layers (each optionally comprising silver). FIG. 3 depicts a double-type low-emissivity coating 80 comprising, in sequence outwardly, an inner transparent dielectric film region 82, an infrared-reflective film 84, a blocker film 86, a middle transparent dielectric film region 88, an infrared-reflective film 184, a blocker film 186, and an outer transparent dielectric film region 90.

The low-emissivity coating, when applied to the #2 surface of a pane that bears the low-maintenance coating on its #1 surface, facilitates the comparable single surface reflectances noted above. In one particular embodiment, the coating comprises (and may consist essentially of), in sequence outwardly, an inner transparent dielectric film region having a thickness of about 90 Å, a silver film having a thickness of about 70 Å, a titanium blocker film having a thickness of about 15 Å, a middle transparent dielectric film region having a thickness of about 510 Å, a silver film having a thickness of about 130 Å, a titanium blocker film having a thickness of about 15 Å, and an outer transparent dielectric film region having a thickness of about 310 Å (optionally as the outermost film of the coating). Also, an optional transparent base layer comprising silica can be provided between the substrate and the inner transparent dielectric film region.

In some cases, the inner transparent dielectric film region comprises (and may consist essentially of) zinc oxide having a thickness of about 90 angstroms. Likewise, in some cases, the middle transparent dielectric film region comprises (and may consist essentially of), in sequence outwardly, a transparent dielectric zinc oxide film having a thickness of about 205 Å, a transparent dielectric tin oxide film having a thickness of about 20 Å, and a transparent dielectric zinc oxide film having a thickness of about 285 Å. Finally, in some cases, the outer transparent dielectric film region comprises (and may consist essentially of), in sequence outwardly, a transparent dielectric zinc oxide film having a thickness of about 95 Å, a transparent dielectric titanium nitride film having a thickness of about 10 Å, a transparent dielectric zinc oxide film having a thickness of about 155 Å, and a transparent dielectric silicon nitride film having a thickness of about 50 Å. Following is an exemplary embodiment of this nature:

TABLE 2 air
50 angstroms $Si_3N_4$
155 angstroms ZnO
10 angstroms TiN

Figure 4:
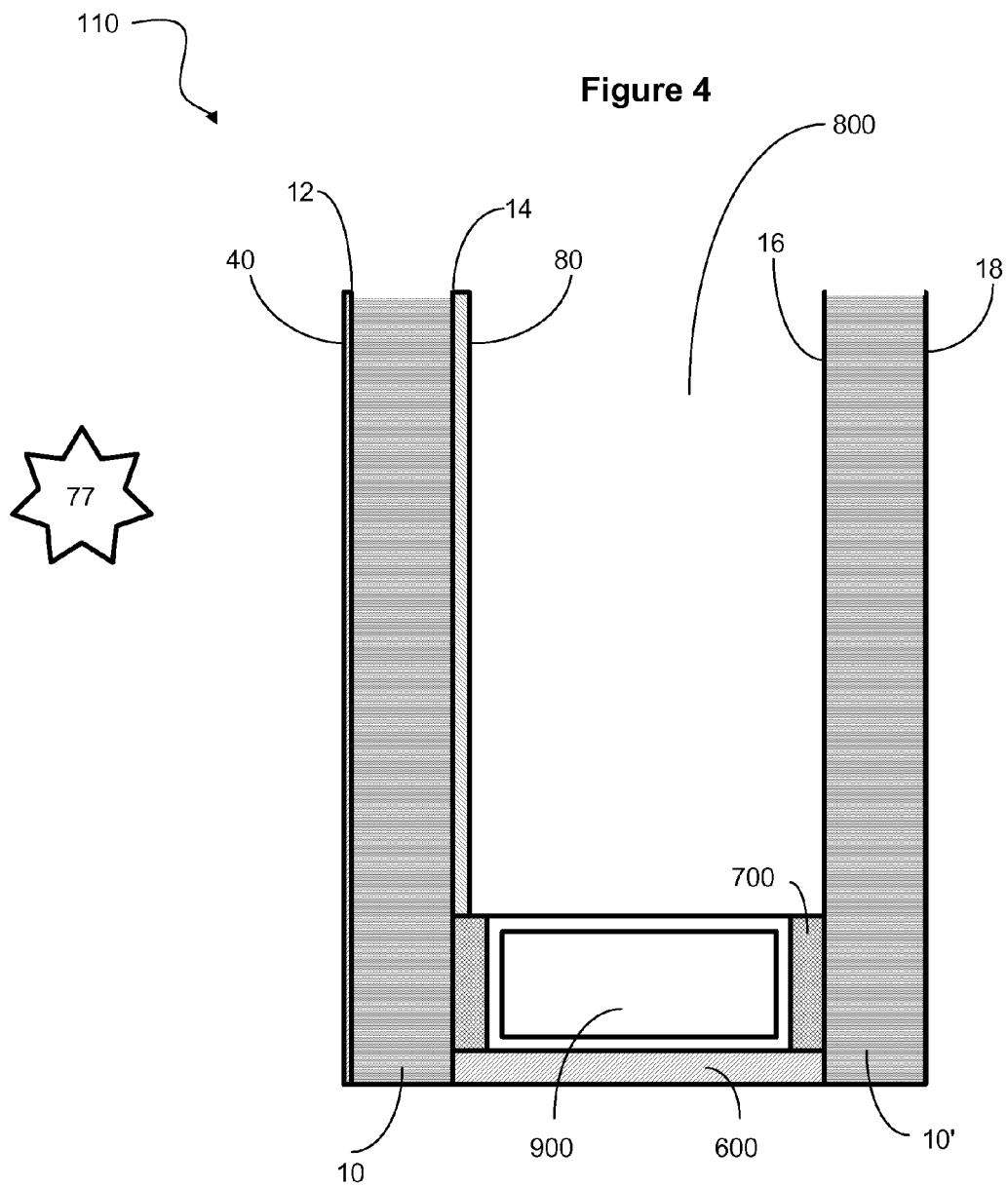
FIG. 4 is a partially broken-away schematic cross-sectional side view of a multiple-pane insulating glass unit that includes a pane bearing both a low-maintenance coating and a low-emissivity coating in accordance with certain embodiments of the invention.

TABLE 2-continued 95 angstroms ZnO
15 angstroms Ti
130 angstroms Ag
285 angstroms ZnO
20 angstroms SnO
205 angstroms ZnO
15 angstroms Ti
70 angstroms Ag
90 angstroms ZnO
glass With reference to FIG. 4, the substrate 10 can be part of an insulating glass unit 110. Typically, an insulating glass unit 110 has an exterior pane 10 and an interior pane 10' separated by a between-pane space 800. A spacer 900 (which can optionally be an integral part of a sash, frame, etc.) is commonly provided to separate the panes 10 and 10'. The spacer can be secured to the interior surfaces of each pane using an adhesive 700. In some cases, an end sealant 600 is also provided.

In the illustrated embodiment, the exterior pane 10 has an exterior surface 12 and an interior surface 14. The interior pane 10' has an interior surface 16 and an exterior surface 18. The pane 10 can be mounted in a frame (e.g., a window frame) such that the exterior surface 12 is exposed to an outdoor environment (e.g., so the low-maintenance coating 40 is exposed to such an environment). Interior surfaces 14 and 16 are both exposed to the atmosphere in the between-pane space 800 of the insulating glass unit. The low-emissivity coating 80 is positioned on interior surface 14.

Figure 5:
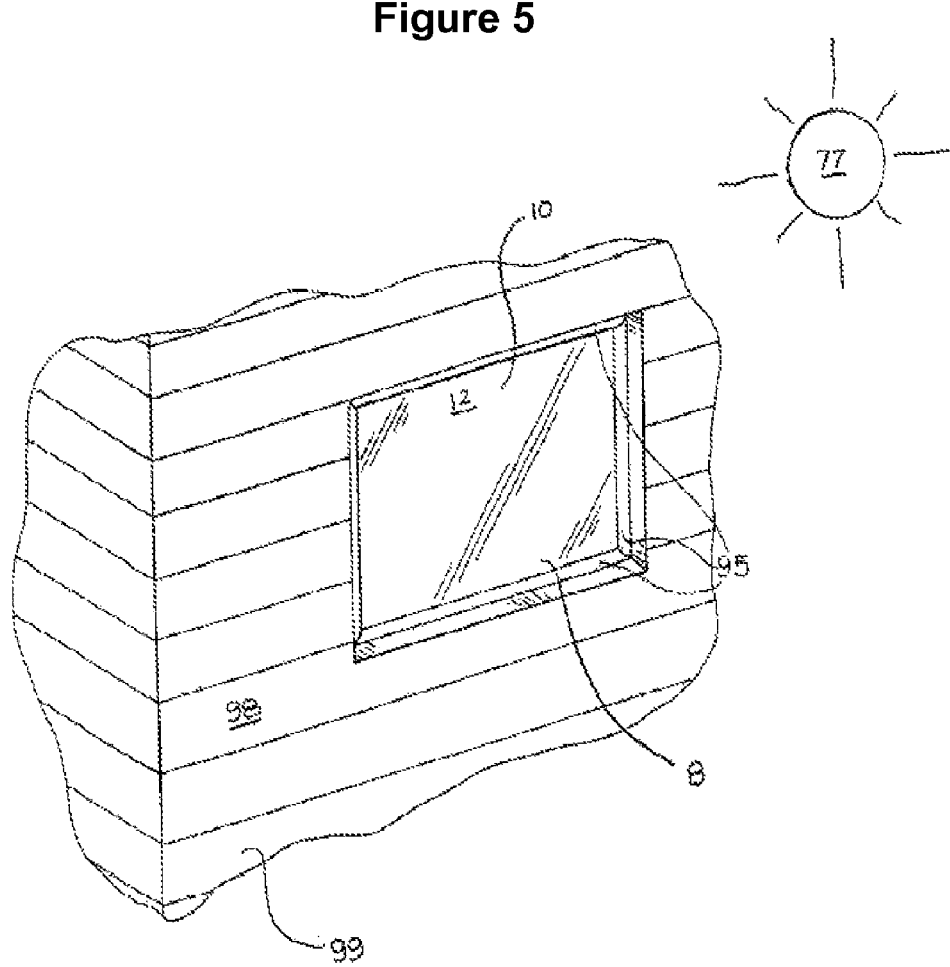
FIG. 5 is a partially broken-away perspective view of a window pane bearing a low-maintenance coating, the pane is mounted in an exterior wall of a building in accordance with certain embodiments of the invention.

The low-maintenance coating 40 is preferably on the "first" surface of a window (e.g., on an exterior surface 12 of an outboard pane 10) and the low-emissivity coating 80 is preferably provided on the "second" surface of the window (e.g., on a room-side surface of an inboard pane). FIG. 5 exemplifies embodiments wherein the substrate 10 (which may be a glass pane) is a window pane that is mounted on a window frame 95 (e.g., in an exterior wall 98 of a building 99). In certain applications, the coated first surface (i.e., surface 12) of such a window will be exposed to an outdoor environment (e.g., such that the coating 40 will be in periodic contact with rain).

The invention also provides methods for producing coated substrates. These methods involve depositing a low-maintenance coating 40 on one surface of a substrate and depositing a low-emissivity coating 80 on an opposite surface of the substrate, so that one coating has a single surface reflectivity that is less than about 3 times, and more than one-third, that of the other coating. Each coating can be deposited by a variety of well known coating techniques. In certain embodiments, the coatings are deposited by sputtering, optionally at a low temperature (e.g., while maintaining the substrate at below about 250 degrees Celsius, and perhaps more preferably below 200 degrees Celsius). Alternatively, other coating techniques can be used, including chemical vapor deposition (CVD), plasma-enhanced chemical vapor deposition, and pyrolytic deposition. Various embodiments of the coatings 40 and 80 have been described, and the present methods involve depositing any of the described coating embodiments by any thin film deposition method.

Figure 6:
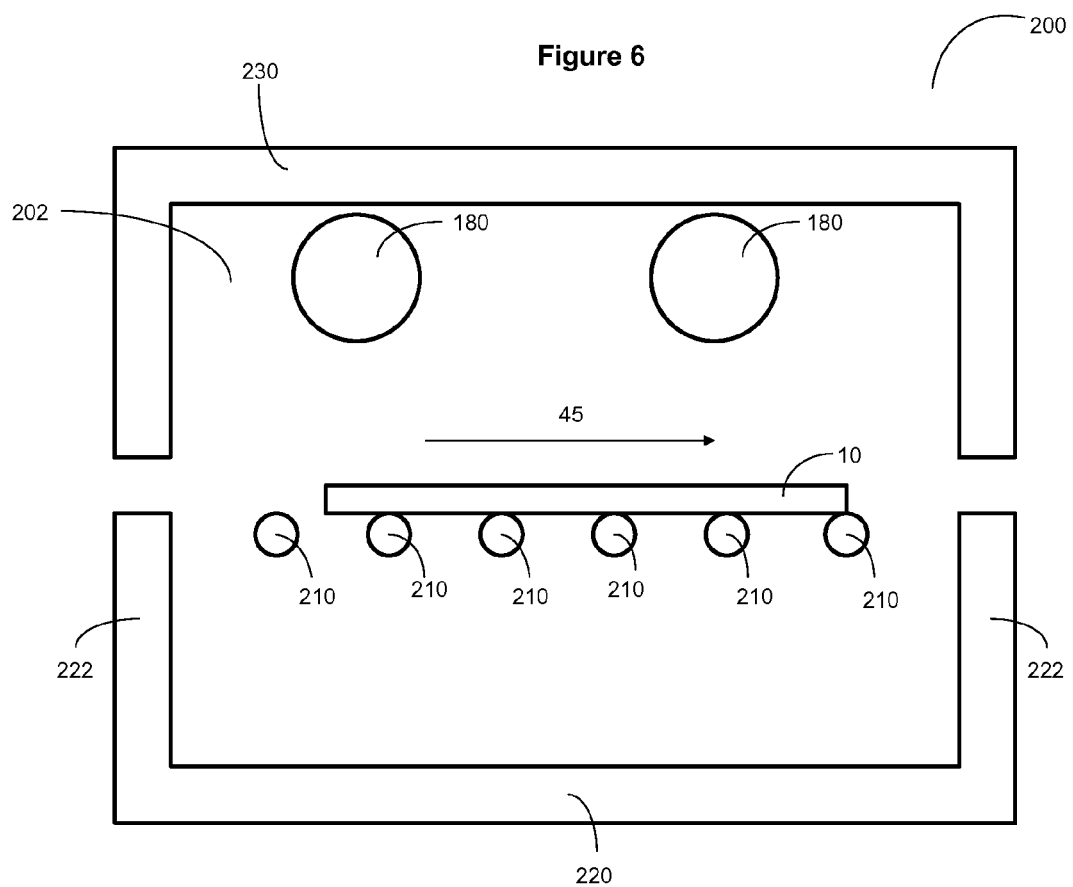
FIG. 6 is a schematic side view of a sputtering chamber that is adapted for use in certain methods of the invention.

Sputtering is well known in the present art. FIG. 6 depicts an exemplary magnetron sputtering chamber 200. Magnetron sputtering chambers and related equipment are commercially available from a variety of sources (e.g., Leybold). Useful magnetron sputtering techniques and equipment are described in U.S. Pat. No. 4,166,018, issued to Chapin, the entire teachings of which concerning sputtering techniques and equipment are incorporated herein by reference.

The illustrated sputtering chamber 200 includes a base (or "floor") 220, a plurality of side walls 222, and a ceiling (or "top lid" or "cover") 230, together bounding a sputtering cavity 202. In FIG. 5, two upper targets 280 are mounted above the path of substrate travel 45. Alternatively, the coatings can be deposited by an upward sputtering method. Either way, the substrate 10 is conveyed along the path of substrate travel 45 during film deposition, optionally over a plurality of spaced-apart transport rollers 210. In FIG. 5, two upper targets are provided, although this is by no means required. For example, a single upper or lower target could alternatively be used in each chamber. Moreover, the chamber can include one or more upper and/or lower planar targets, although cylindrical targets are shown.

Preferably, though not necessarily, the sputtering of both coatings 40, 80 is carried out while maintaining the substrate at a temperature of less than about 250 degrees Celsius, and more preferably less than 200 degrees Celsius (e.g., without supplemental heating of the substrate). In such cases, the coating preferably is sputter deposited without any supplemental means for delivering energy to a growing film (e.g., without any heating of the substrate beyond that which occurs normally from the plasma and ion bombardment of conventional sputtering). In other cases, a film is deposited by a sputter deposition technique that includes supplemental heating (or other supplemental energy delivery).

In certain embodiments, the sputtering of both coatings 40 and 80 is carried by a process that includes using at least one dual-direction sputtering chamber. FIG. 7 illustrates an exemplary dual-direction sputtering chamber 300. Dual-direction sputtering chambers are described in U.S. patent application Ser. Nos. 09/868,542, 10/911,155, and 10/922,719, the entire teachings of each of which concerning sputtering equipment and techniques are incorporated herein by reference.

In FIG. 7, the illustrated chamber 300 includes a base (or "floor") 320, a plurality of side walls 322, and a ceiling (or "top lid" or "cover") 330, together bounding a sputtering cavity 302. Two upper targets 380a are mounted above the path of substrate travel 45 and two lower targets 380b are mounted below the path of substrate travel. The substrate 10 is conveyed along the path of substrate travel 45 during film deposition, optionally over a plurality of spaced-apart transport rollers 310. Both the upper targets 380a and lower targets 380b are sputtered simultaneously to deposit a coating 40 on one surface of the substrate and coating 80 on the opposite surface. In certain embodiments, the upper targets 380a are sputtered to downwardly deposit a low-emissivity coating 40 on the surface 12 of the substrate. The lower targets 380b are also sputtered to upwardly deposit a low-maintenance coating 80 on the surface 14 of the substrate.

EXAMPLE

Reflectance measurements were obtained for certain exemplary low-emissivity and low-maintenance coatings. Four glass substrates were obtained, each being coating-free on one major surface and having a low-maintenance coating on the opposite major surface. The low-maintenance coating on each substrate was a coating as depicted in Table 1 above. Four additional glass substrates were obtained, each being coating-free on one major surface and having a low-emissivity coating on the opposite major surface. The low-emissivity coating on each of these four substrates was a coating as depicted in Table 2.

The coating-free surface of each glass substrate was chemically etched in order to remove substantially all materials that contribute to reflection. Armour Etch glass etching cream was applied to the coating-free surface with a sponge paint brush. Each substrate was placed inside a fume hood for approximately 30 minutes to etch. The etching cream was then removed by washing with pressurized deionized water and each substrate was allowed to dry vertically.

The single-surface reflectance was then measured for each substrate bearing the low-emissivity coating and for each substrate bearing the low-maintenance coating. The reflectance measurements were taken using a Hunter lab Ultrascan. The average reflectance for the low-maintenance coatings was about 9.38%, and the average reflectance for the low-emissivity coatings was about 4.46%. Thus, the low-maintenance coating had a reflectivity that was about 2.1 times that of the low-emissivity coating.

While a preferred embodiment of the present invention has been described, it should be understood that various changes, adaptations and modifications may be made therein without departing from the spirit of the invention and the scope of the appended claims.

What is claimed is:

1. A sheet-like pane having generally opposed first and second major surfaces, the first major surface bearing a low-maintenance coating, the second major surface bearing a low-emissivity coating, wherein one of the low-maintenance coating and the low-emissivity coating has a single surface reflectance that is less than 3 times, and more than one-third, that of the other coating, wherein the low-emissivity coating includes an infrared-reflecting film comprising silver, and the low-maintenance coating includes a silicon-containing base film having a thickness of less than 100 angstroms and a titanium-containing film having a thickness of less than 50 angstroms.

2. The pane of claim 1 wherein one of the low-maintenance coating and the low-emissivity coating has a single surface reflectance that is less than about 2½ times, and more than about 0.4 times, that of the other coating.

3. The pane of claim 1 wherein the low-maintenance coating has a single surface reflectance that is between about 2 and about 2½ times that of the low-emissivity coating.

4. The pane of claim 1 wherein the titanium-containing film includes titanium dioxide or substoichiometric titanium dioxide.

5. The pane of claim 4 wherein the low-maintenance coating comprises at least two films and has a total thickness of less than 350 Å.

6. The pane of claim 5 wherein said total thickness is less than 175 Å.

7. The pane of claim 1 wherein the titanium-containing film has a thickness of between 5 angstroms and about 45 angstroms.

8. The pane of claim 1 wherein the titanium-containing film is provided as a mixed film comprising titania and silica.

9. The pane of claim 1 wherein the base film is deposited directly onto the first surface of the sheet-like pane and the titanium-containing film is deposited onto the base film.

10. The pane of claim 1 wherein the base film comprises silica and alumina.

11. The pane of claim 1 wherein the low-emissivity coating comprises, from the second major surface outwardly, an inner transparent dielectric film region having a thickness of between about 80 angstroms and about 100 angstroms, an infrared-reflecting film having a thickness of between about 60 angstroms and about 80 angstroms, a metal-containing blocker film having a thickness of between about 10 angstroms and between about 20 angstroms, a middle transparent dielectric film region having a thickness of between about 450 angstroms and about 570 angstroms, an infrared-reflecting film having a thickness of between about 115 angstroms and about 145 angstroms, a metal-containing blocker film having a thickness of between about 10 angstroms and about 20 angstroms, and an outer transparent dielectric film region having a thickness of between about 275 angstroms and about 345 angstroms.

12. The pane of claim 1 wherein both the low-maintenance coating and the low-emissivity coating are sputtered coatings.

13. The pane of claim 1 wherein the sheet-like pane is a window pane mounted in a window frame, such that the low-maintenance coating is exposed to an outdoor environment.

14. The pane of claim 1 wherein the pane is part of an insulating glass unit comprising two spaced-apart panes bounding a between-pane space.

15. The pane of claim 1, wherein the low-maintenance coating has a single surface reflectance of less than 10%, and the low-emissivity coating has a single surface reflectance of less than 5%.

16. The pane of claim 1, wherein the titanium-containing film has a refractive index between about 1.7 and about 1.57.

17. The pane of claim 1, wherein the pane defines a thickness between about 1 millimeter and about 5 millimeters.

18. A sheet-like pane bearing a low-maintenance coating on a first major surface and a low-emissivity coating on a second major surface, wherein one of the low-maintenance coating and the low-emissivity coating has a single surface reflectance that is less than 3 times, and more than one-third, that of the other coating, wherein the low-maintenance coating has a thickness of less than about 350 angstroms and comprises a silicon-containing base film positioned directly over the first major surface and a titanium-containing film positioned directly over the base film, wherein the silicon-containing base film has a thickness of less than about 100 angstroms, and wherein the titanium-containing film has a thickness of less than about 50 angstroms, wherein the low-emissivity coating includes an infrared-reflecting film comprising silver.

19. A sheet-like pane bearing a low-maintenance coating on a first major surface and a low-emissivity coating on a second major surface, wherein one of the low-maintenance coating and the low-emissivity coating has a single surface reflectance that is between about 2 and about 2½ times that of the other coating, wherein the low-maintenance coating has a thickness of less than about 200 angstroms and comprises a base film positioned directly over the first major surface and a titanium-containing film positioned directly over the base film, wherein the base film comprises silica has a thickness of less than about 100 angstroms, and wherein the titanium-containing film has a thickness of less than about 50 angstroms, wherein the low-emissivity coating includes an infrared-reflecting film comprising silver.

20. The pane of claim 19 wherein the titanium-containing film is provided as a mixed film comprising titania and silica.

21. A method of depositing a low-emissivity coating onto a first major surface of a sheet-like pane and depositing a low-maintenance coating onto a second major surface of the pane, the method comprising:

depositing a low-maintenance coating onto the first major surface, wherein depositing the low-maintenance coating comprises depositing a silicon-containing base film to a thickness of less than about 100 angstroms directly on the first major surface, and depositing a titanium-containing film to a thickness of less than about 50 angstroms directly on the base film; and depositing a low-emissivity coating onto the second major surface, wherein one of the low-emissivity coating and the low-maintenance coating has a single surface reflectance of less than 3 times, and more than one-third, that of the other coating.

22. The method of claim 21 wherein the base film comprises silica.

23. The method of claim 22 wherein the base film is deposited as a film consisting essentially of silica.

24. The method of claim 21 wherein the low-maintenance coating includes a titanium-containing film deposited as a film comprising titanium dioxide or substoichiometric titanium oxide.

25. The method of claim 24 wherein the titanium-containing film is deposited as a mixed film comprising titania and silica.

26. The method of claim 25 wherein the mixed film is deposited so that titania is present in an amount less than about 30 weight percent with the remainder being silica.

27. The method of claim 21 further comprising mounting the substrate in a window frame, such that the first major surface is exposed to an outdoor environment.

28. The method of claim 21 wherein the low-maintenance coating and low-emissivity coating are both deposited by sputtering.

29. The method of claim 28 wherein the sputtering is carried out while maintaining the pane at a temperature of less than about 250 degrees Celsius.

* * * * *